E. L. SNYDER.
DIFFERENTIAL GEARING.
APPLICATION FILED NOV. 20, 1919.

1,341,286.

Patented May 25, 1920.
2 SHEETS—SHEET 1.

INVENTOR.
Edward L. Snyder.
BY
ATTORNEY.

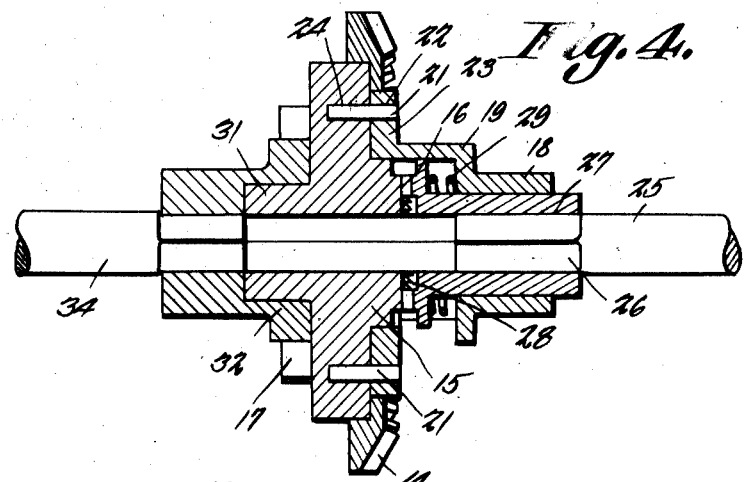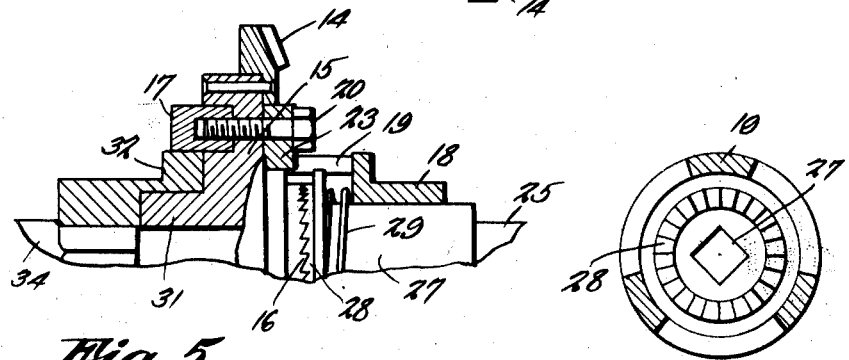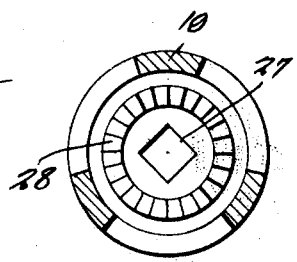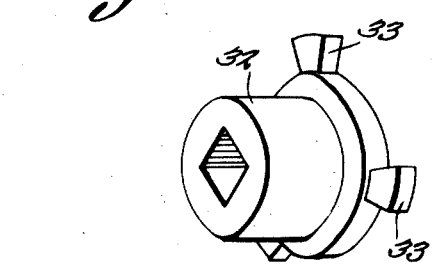

UNITED STATES PATENT OFFICE.

EDWARD L. SNYDER, OF HARRISBURG, PENNSYLVANIA.

DIFFERENTIAL GEARING.

1,341,286.  Specification of Letters Patent.  Patented May 25, 1920.

Application filed November 20, 1919. Serial No. 339,301.

*To all whom it may concern:*

Be it known that I, EDWARD L. SNYDER, a citizen of the United States of America, and resident of Harrisburg, in the county of Dauphin and State of Pennsylvania, have invented certain new and useful Improvements in Differential Gearing, of which the following is a specification.

This invention relates to differential gearing and particularly to a direct driving mechanism, whereby the power can be communicated to both wheels of an automobile, tractor, or the like and the said invention has for its object the provision of novel means whereby this power may be applied in the manner stated while at the same time permitting compensation for variable distance of travel of the two wheels when making turns, the said device also have novel means whereby either wheel may have certain independent motion with respect to the other wheel within predetermined bounds without affecting the efficiency of the device.

A further object of the invention is to provide a direct driving differential having anti-friction members interposed so as to minimize the wear of the parts and the power required for its operation.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, and in which—

Fig. 4 illustrates a longitudinal sectional view through the gearing;

Fig. 5 illustrates a sectional detail through the said gearing on a line at an angle to the section shown in Fig. 4;

Fig. 6 illustrates a sectional view of the yoke arms showing the face of the clutch in elevation; and Fig. 7 illustrates a perspective view of the coupling between the gearing and axle.

Figure 1:
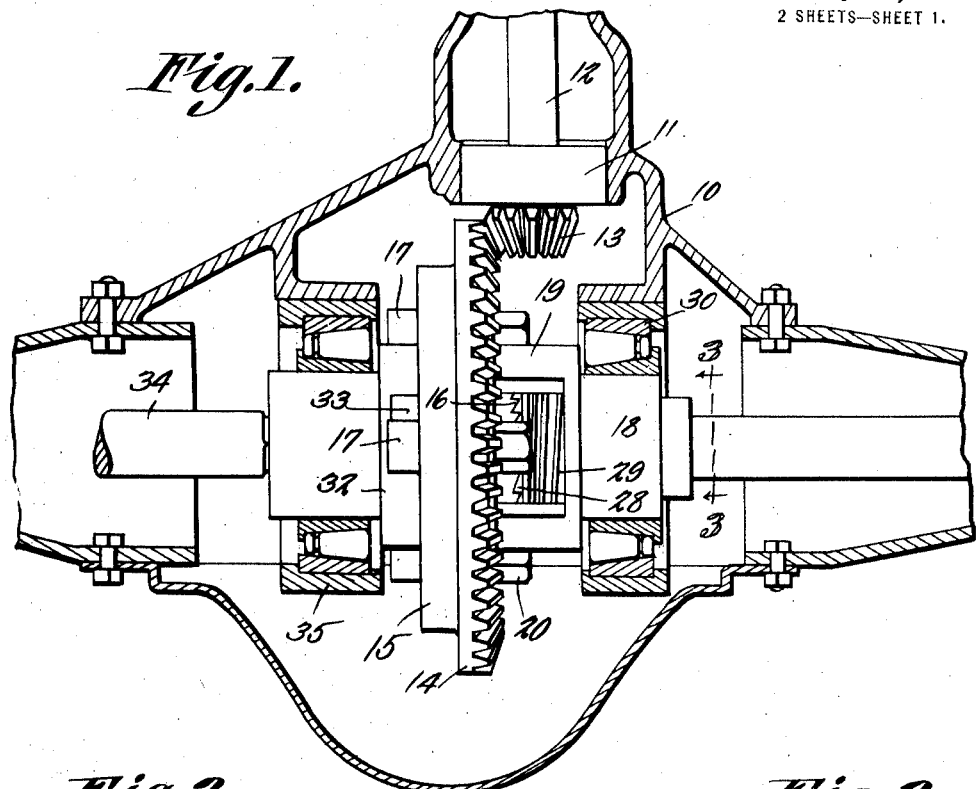
Figure 1 illustrates a sectional view of a gear case with the gearing therein, partly in section and partly in elevation.
Figure 2:
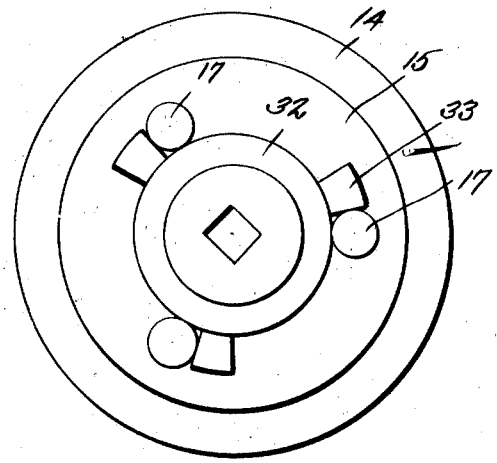
Fig. 2 illustrates a view in elevation showing the coupling between one of the axles and the driving wheel with the bearings omitted.
Figure 3:
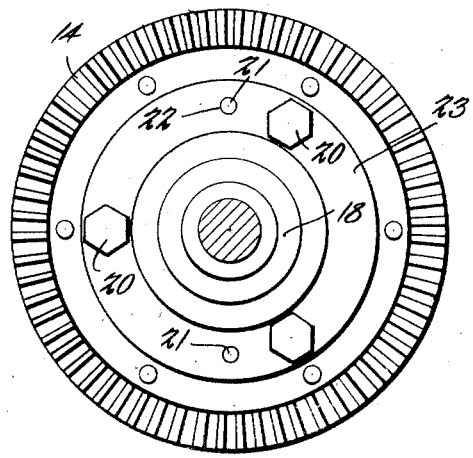
Fig. 3 illustrates a sectional view on the line 3—3 of Fig. 1.

In these drawings 10 denotes a casing which may be of any ordinary construction and need not be described in detail. A bearing 11 is carried by the casing and the drive shaft 12 is journaled therein, the said drive shaft having a pinion 13 meshing with the teeth of the wheel 14 which wheel is positively driven at all times while the drive shaft is rotating.

The wheel 14 is attached to a body or hub 15 having ratchet teeth 16 on one of its faces and studs 17 on its opposite face.

A bearing 18 has arms or yokes 19 attached to the body 15 by screws 20 and centering studs or pins 21 extend through apertures 22 in the flange 23 of the yokes and into seats or recesses 24 of the body, so that the yoke is held in place by the pins and the screws.

An axle 25 has an angular cross section as shown at 26 and it fits in a tubular extension 27 of the ratchet member 28 which ratchet member coacts with the ratchet teeth 16 to couple the shaft 25 with the hub or body 15 or to permit independent movement of the wheel with respect to the said hub according to the requirements in practice, as will presently appear. The ratchet members are forced into operative relation to each other by a coiled spring 29 encircling the extension of the ratchet member and abutting the bearing 18 and a flange of the ratchet member. The ratchet teeth are thereby held in engagement so that when the toothed wheel 14 is driven, the axle 25 will be rotated.

Antifriction bearing 30 are arranged in the casing to support the bearing 18 but as such anti-friction devices are well known and as any particular form of anti-friction bearing may be employed, the one here shown will not be further described.

The member 15 has an extension 31 on which a sleeve 32 is partially rotatable, the said sleeve having lugs 33 which engage the studs 17 so that the rotation of the member 15 is communicated to the said sleeve. These lugs 33 may be diminished in number if it is found that more or less independent movement of one member with relation to the other is desirable or that one of the wheels be permitted independent movement so that the one which travels on the outside may move faster than the one traveling on the inside. The fact, therefore, that the lugs 33 and studs 17 are spaced apart, will permit a certain degree of independent movement to compensate for this difference in travel of the two wheels, whereas the ratchet teeth will likewise be permitted to compensate for unequal distance of travel when the wheels are traveling on a reverse curve. The axle 34 has its inner end extending into a coupling on the sleeve 32 and by reason of the arrangement of parts, both axles will be positively driven and when traveling in a straight line, they will have certain latitude of movement of the driving device when traveling in curves, either right or left. The sleeve 32 is rotatably mounted in a bearing 35 and this anti-friction bearing may be of any approved type.

The construction, operation and advantages will, it is thought, be understood by those skilled in the art and as a description of the functions of the elements have been given in connection with the description of the elements, further résumé of the operation of the device is believed to be unnecessary.

I claim—

1. In a differential gearing, a driven gear wheel, means for driving the said gear wheel, ratchet teeth carried by the gear wheel, a ratchet member coacting with the ratchet teeth and having a tubular extension, an axle driven by the said tubular member, a bearing in which the tubular member rotates, said bearing having a yoke whereby it is coupled to the driven wheel, means for yieldably holding the ratchet teeth in engagement, a member coupled to the gear wheel and having studs thereon, a sleeve rotatable with relation to the member and having lugs coacting with the studs and an axle connected to the last mentioned member.

2. In a differential gearing, a driven gear wheel, a member coupled thereto, studs on the said member, a sleeve rotatable on the said member, lugs on the said sleeve coacting with the studs of the member, a shaft, an axle connected to the sleeve, a ratchet member, ratchet teeth on the first mentioned member coacting with the ratchet member, a bearing in which the ratchet member is rotatable, means for attaching the bearing to the first mentioned member, means for yieldingly holding the ratchet teeth of one member in engagement with the ratchet teeth of the other member, means for rotatably supporting the bearing and the sleeve, and an axle coupled to the ratchet member.

3. In a differential gearing, a driven toothed wheel, means for driving the wheel, a member to which the toothed wheel is attached, studs on the said member, a sleeve rotatable on the said member, lugs on the sleeve coacting with the studs of the member, an axle coupled to the said sleeve, ratchet teeth on the said member, a sleeve having ratchet teeth coacting with the ratchet teeth of the member, a bearing in which the sleeve is rotatable, means for connecting the sleeve to the member, means for holding the ratchet teeth of one member in operative relation to the ratchet teeth of the other member, and an axle connected to the said ratchet sleeve.

4. In a differential gearing, a driven toothed wheel, means for driving the wheel, a member to which the toothed wheel is attached, studs on the said member, a sleeve rotatable on the said member, lugs on the sleeve coacting with the studs of the member, an axle coupled to the said sleeve, ratchet teeth on the said member, a sleeve having ratchet teeth coacting with the ratchet teeth of the member, a bearing in which the sleeve is rotatable, means for connecting the sleeve to the member, means for holding the ratchet teeth of one member in operative relation to the ratchet teeth of the other member, an axle connected to the said ratchet sleeve, and means for rotatably supporting the bearing, and means for rotatably supporting the sleeve.

EDWARD L. SNYDER.